(12) United States Patent
Quan et al.

(10) Patent No.: US 10,252,159 B2
(45) Date of Patent: *Apr. 9, 2019

(54) APPLICATION STATE BACKUP AND RESTORATION ACROSS MULTIPLE DEVICES

(71) Applicant: RAZER (ASIA-PACIFIC) PTE. LTD., Singapore (SG)

(72) Inventors: Justin Quan, San Francisco, CA (US); Michael A. Chan, San Francisco, CA (US); Tom Moss, Los Altos, CA (US); Michael K. Fleming, San Francisco, CA (US)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/674,579

(22) Filed: Aug. 11, 2017

(65) Prior Publication Data

US 2017/0340966 A1 Nov. 30, 2017

Related U.S. Application Data

(63) Continuation of application No. 14/043,034, filed on Oct. 1, 2013, now Pat. No. 9,776,078, which is a
(Continued)

(51) Int. Cl.
H04L 29/08 (2006.01)
G06F 17/30 (2006.01)
(Continued)

(52) U.S. Cl.
CPC .............. *A63F 13/40* (2014.09); *A63F 13/23* (2014.09); *A63F 13/45* (2014.09); *A63F 13/50* (2014.09);
(Continued)

(58) Field of Classification Search
CPC ......... A63F 13/40; A63F 13/50; H04W 4/003
(Continued)

(56) References Cited

U.S. PATENT DOCUMENTS 6,684,229 B1 * 1/2004 Luong ................. G06F 11/1458
6,811,486 B1 11/2004 Luciano, Jr.
(Continued)

FOREIGN PATENT DOCUMENTS

EP 2680207 A1 1/2014

OTHER PUBLICATIONS

"New Phone: How to Transfer Game Progress?"—Android Enthusiasts, Mar. 28, 2012 https://android.stackexchange.com/questions/21112/new-phone-how-to-transfer-game-progress.*
(Continued)

*Primary Examiner* — Randy A Scott
(74) *Attorney, Agent, or Firm* — Mattingly & Malur, PC

(57) ABSTRACT

Some examples include backing up and restoring an application state across multiple devices. For example, an instance of a computer application may be executed at a first electronic device and a backup event that occurs in the first electronic device may be determined. The backup event may suggest a backup of application state data and the application state data may represent an application state of the computer application at the backup event. The application state data of the computer application is transmitted to a remote storage service in response to the backup event. A second electronic device can retrieve the application state data from the remote storage service and restore the application state.

18 Claims, 7 Drawing Sheets

Related U.S. Application Data continuation-in-part of application No. 13/772,163, filed on Feb. 20, 2013, now Pat. No. 9,106,721.

(60) Provisional application No. 61/708,794, filed on Oct. 2, 2012.

(51) Int. Cl.
| | | |
|---|---|---|
| *A63F 13/40* | (2014.01) | |
| *A63F 13/23* | (2014.01) | |
| *A63F 13/45* | (2014.01) | |
| *H04W 4/60* | (2018.01) | |
| *A63F 13/50* | (2014.01) | |
| *G06F 9/48* | (2006.01) | |

(52) U.S. Cl.
CPC ...... *G06F 9/4856* (2013.01); *G06F 17/30575* (2013.01); *H04L 67/1095* (2013.01); *H04W 4/60* (2018.02)

(58) Field of Classification Search
USPC .................. 709/205, 206, 207, 217, 231
See application file for complete search history.

(56) References Cited

U.S. PATENT DOCUMENTS

| | | | |
|---|---|---|---|
| 7,315,740 B2 | 1/2008 | Maes | |
| 7,326,117 B1 | 2/2008 | Best | |
| 7,490,045 B1 | 2/2009 | Flores et al. | |
| 7,657,583 B2* | 2/2010 | Erdmenger | G06F 11/1469 |
| | | | 707/674 |
| D611,494 S | 3/2010 | Akiyoshi et al. | |
| 7,774,457 B1 | 8/2010 | Talwar et al. | |
| 7,903,383 B2 | 3/2011 | Fukano et al. | |
| 8,005,956 B2 | 8/2011 | Williams et al. | |
| D646,695 S | 10/2011 | Hoggarth et al. | |
| 8,234,348 B1 | 7/2012 | Tulchinsky et al. | |
| 8,290,920 B2 | 10/2012 | Mahajan et al. | |
| 8,315,977 B2 | 11/2012 | Anand et al. | |
| 8,423,511 B1 | 4/2013 | Bhatia | |
| D682,874 S | 5/2013 | Frijlink et al. | |
| 8,438,298 B2 | 5/2013 | Arai et al. | |
| D683,737 S | 6/2013 | Brinda et al. | |
| 8,473,577 B2 | 6/2013 | Chan | |
| 8,475,275 B2 | 7/2013 | Weston et al. | |
| 8,478,816 B2 | 7/2013 | Parks et al. | |
| 8,494,576 B1 | 7/2013 | Bye et al. | |
| 8,495,129 B2 | 7/2013 | Wolman et al. | |
| 8,515,902 B2 | 8/2013 | Savage | |
| D689,505 S | 9/2013 | Convay et al. | |
| 8,539,567 B1 | 9/2013 | Logue et al. | |
| 8,577,292 B2 | 11/2013 | Huibers | |
| 8,589,140 B1 | 11/2013 | Poulin | |
| 8,606,948 B2* | 12/2013 | Evans | H04L 67/1095 |
| | | | 709/230 |
| 8,666,938 B1 | 3/2014 | Pancholy | |
| 8,747,232 B1 | 6/2014 | Quan et al. | |
| 8,775,449 B2 | 7/2014 | Quan et al. | |
| D710,878 S | 8/2014 | Jung | |
| 8,812,601 B2 | 8/2014 | Hsieh et al. | |
| 8,868,859 B2 | 10/2014 | Schmidt et al. | |
| D718,334 S | 11/2014 | Cranfill | |
| 8,913,056 B2 | 12/2014 | Zimmer et al. | |
| D726,753 S | 4/2015 | Angelides | |
| D730,383 S | 5/2015 | Brinda et al. | |
| D731,537 S | 6/2015 | Jeong et al. | |
| D732,549 S | 6/2015 | Kim | |
| D734,775 S | 7/2015 | Nagasawa et al. | |
| D736,822 S | 8/2015 | Tursi et al. | |
| D737,852 S | 9/2015 | De La Rosa et al. | |
| 9,138,644 B2 | 9/2015 | Perlman | |
| 2001/0039212 A1 | 11/2001 | Sawano et al. | |
| 2002/0161908 A1 | 10/2002 | Benitez et al. | |
| 2003/0069037 A1 | 4/2003 | Kiyomoto et al. | |
| 2004/0018876 A1 | 1/2004 | Kubota et al. | |
| 2004/0203381 A1 | 10/2004 | Cahn et al. | |
| 2005/0147130 A1 | 7/2005 | Hurwitz et al. | |
| 2006/0030408 A1 | 2/2006 | Kiiskinen | |
| 2006/0073788 A1 | 4/2006 | Halkka et al. | |
| 2006/0161748 A1* | 7/2006 | Wang | G06F 9/4418 |
| | | | 711/162 |
| 2007/0130217 A1 | 6/2007 | Linyard et al. | |
| 2008/0055311 A1 | 3/2008 | Aleksic et al. | |
| 2008/0220878 A1 | 9/2008 | Michaelis | |
| 2009/0063690 A1 | 3/2009 | Verthein et al. | |
| 2009/0077263 A1 | 3/2009 | Koganti et al. | |
| 2009/0106110 A1 | 4/2009 | Stannard et al. | |
| 2009/0144341 A1* | 6/2009 | Hauck | G06F 11/1464 |
| 2009/0204966 A1 | 8/2009 | Johnson et al. | |
| 2009/0282125 A1 | 11/2009 | Jeide et al. | |
| 2010/0173712 A1 | 7/2010 | Buhr | |
| 2010/0235511 A1 | 9/2010 | Kai | |
| 2010/0257403 A1 | 10/2010 | Virk et al. | |
| 2010/0332401 A1 | 12/2010 | Prahlad et al. | |
| 2011/0076941 A1 | 3/2011 | Taveau et al. | |
| 2011/0078319 A1 | 3/2011 | Ishida | |
| 2011/0093567 A1 | 4/2011 | Jean et al. | |
| 2011/0106755 A1 | 5/2011 | Hao et al. | |
| 2011/0126168 A1 | 5/2011 | Ilyayev | |
| 2011/0219105 A1 | 9/2011 | Kryze et al. | |
| 2011/0252071 A1 | 10/2011 | Cidon | |
| 2011/0275316 A1 | 11/2011 | Suumäki et al. | |
| 2011/0286026 A1 | 11/2011 | Matsuzawa | |
| 2011/0313922 A1 | 12/2011 | Ben Ayed | |
| 2012/0017236 A1 | 1/2012 | Stafford et al. | |
| 2012/0023250 A1 | 1/2012 | Chen et al. | |
| 2012/0028714 A1 | 2/2012 | Gagner et al. | |
| 2012/0036218 A1 | 2/2012 | Oh et al. | |
| 2012/0036239 A1 | 2/2012 | Donaghey et al. | |
| 2012/0079095 A1 | 3/2012 | Evans et al. | |
| 2012/0079126 A1 | 3/2012 | Evans et al. | |
| 2012/0084803 A1 | 4/2012 | Johansson et al. | |
| 2012/0110568 A1 | 5/2012 | Abel et al. | |
| 2012/0128172 A1 | 5/2012 | Alden | |
| 2012/0149309 A1 | 6/2012 | Hubner et al. | |
| 2012/0171951 A1 | 7/2012 | 't Hooft | |
| 2012/0203932 A1 | 8/2012 | da Costa et al. | |
| 2012/0210343 A1 | 8/2012 | McCoy et al. | |
| 2012/0303778 A1 | 11/2012 | Ahiska et al. | |
| 2012/0311820 A1 | 12/2012 | Chang | |
| 2013/0007203 A1 | 1/2013 | Szu | |
| 2013/0008611 A1 | 1/2013 | Marcus et al. | |
| 2013/0044106 A1 | 2/2013 | Shuster et al. | |
| 2013/0045795 A1 | 2/2013 | Fiedler | |
| 2013/0086114 A1 | 4/2013 | Wilson et al. | |
| 2013/0117806 A1 | 5/2013 | Parthasarathy et al. | |
| 2013/0159890 A1 | 6/2013 | Rossi | |
| 2013/0219381 A1 | 8/2013 | Lovitt | |
| 2013/0223240 A1 | 8/2013 | Hayes et al. | |
| 2013/0225087 A1 | 8/2013 | Uhm | |
| 2013/0304898 A1 | 11/2013 | Aggarwal et al. | |
| 2013/0339058 A1 | 12/2013 | Gotlib et al. | |
| 2014/0040239 A1 | 2/2014 | Hirsch | |
| 2014/0053054 A1 | 2/2014 | Shen et al. | |
| 2014/0101300 A1 | 4/2014 | Rosensweig et al. | |
| 2014/0170978 A1 | 6/2014 | Wolman et al. | |
| 2014/0215030 A1 | 7/2014 | Terwilliger et al. | |
| 2014/0245203 A1 | 8/2014 | Lee et al. | |
| 2014/0379853 A1 | 12/2014 | Shelton | |
| 2015/0286388 A1 | 10/2015 | Jeon et al. | |

OTHER PUBLICATIONS

Kevin, "Android Automatic App Updates Part 2," Worldstart's Tech Tips and Computer Help, dated Apr. 10, 2012, Retrieved from the Internet URL: http://www.worldstart.com/android-automatic-app-updates-part-2/, retrieved on Oct. 22, 2015, pp. 1-3.

Khan, S., "ZDBox for Android Is All-in-One Toolkit to Monitor and Manage Device," dated Mar. 4, 2011, Retrieved from the Internet URL: http://www.addictivetips.com/mobile/zdbox-for-android-is-all-in-one-toolkit-to-monitor-and-manage-device/, retrieved on Oct. 27, 2015, pp. 1-6.

(56) References Cited

OTHER PUBLICATIONS

Nickinson, P., "Add a signature in gmail," Android Central, dated Nov. 29, 2010, Retrieved from the Internet URL: http://www.androidcentral.com/add-signature-gmail, retrieved on Oct. 26, 2015, pp. 1-10.
Notice of Allowance dated Nov. 4, 2015, for U.S. Appl. No. 14/158,733, of Quan, J., et al., filed Jan. 17, 2014.
Ex Parte Quayle Action dated Dec. 3, 2015, for U.S. Appl. No. 29/486,424, of Chan, M. A., et al., filed Mar. 28, 2014.
Notice of Allowance dated Jan. 11, 2016, for U.S. Appl. No. 14/042,398, of Chan, M.A., et al., filed Sep. 30, 2013.
Notice of Allowance dated Feb. 12, 2016, for U.S. Appl. No. 13/865,515, of Quan, J., et al., filed Apr. 18, 2013.
Notice of Allowance dated Feb. 12, 2016, for U.S. Appl. No. 14/228,190, of Quan, J., et al., filed Mar. 27, 2014.
Final Office Action dated Feb. 26, 2016, for U.S. Appl. No. 14/042,509, of Chan, M.A., et al., filed Sep. 30, 2013.
Non-Final Office Action dated May 15, 2015, for U.S. Appl. No. 14/042,398, by Chan, M.A., et al., filed Sep. 30, 2013.
Non-Final Office Action dated Jun. 22, 2015, for U.S. Appl. No. 14/158,682, of Quan, J., et al., filed Jan. 17, 2014.
Non-Final Office Action dated Jul. 20, 2015, for U.S. Appl. No. 14/042,509, of Chan, M.A., et al., filed Sep. 30, 2013.
Notice of Allowance dated Jul. 24, 2015, for U.S. Appl. No. 14/158,733, of Quan, J., et al., filed Jan. 17, 2014.
Non-Final Office Action dated Aug. 21, 2015, for U.S. Appl. No. 14/042,567, of Chan, M.A., et al., filed Sep. 30, 2013.
Notice of Allowance dated Sep. 2, 2015, for U.S. Appl. No. 14/042,398, of Chan, M.A., et al., filed Sep. 30, 2013.
Final Office Action dated Sep. 9, 2015, for U.S. Appl. No. 14/251,463, of Quan, J., et al., filed Apr. 11, 2014.
Notice of Allowance dated Oct. 2, 2015, for U.S. Appl. No. 14/228,190, of Quan, J., et al., filed Mar. 27, 2014.
Notice of Allowance dated Oct. 7, 2015, for U.S. Appl. No. 13/865,515, of Quan, J., et al., filed Apr. 18, 2013.
U.S. Appl. No. 14/804,696, of Quan, J., et al., filed Jul. 21, 2015.
U.S. Appl. No. 14/836,032, of Quan, J., et al., filed Aug. 26, 2015.
McCormick, Z. and Schmidt, D. C., "Data Synchronization Patterns in Mobile Application Design," Vanderbilt University, pp. 1-14 (2012).
Notice of Allowance dated Oct. 29, 2014, for U.S. Appl. No. 14/167,939 by Quan, J., et al., filed Jan. 29, 2014.
Notice of Allowance dated Oct. 29, 2014, for U.S. Appl. No. 14/179,744 by Quan, J., et al., filed Feb. 13, 2014.
Notice of Allowance dated Nov. 25, 2014, for U.S. Appl. No. 14/252,674 by Chan, M.A., et al., filed Apr. 14, 2014.
Non Final Office Action dated Dec. 3, 2014, for U.S. Appl. No. 14/251,463 by Quan, J., et al., filed Apr. 11, 2014.
Notice of Allowance dated Dec. 4, 2014, for U.S. Appl. No. 14/479,140 by Chan, M.A., et al., filed Sep. 5, 2014.
Notice of Allowance dated Dec. 12, 2014, for U.S. Appl. No. 14/479,140 by Chan, M.A., et al., filed Sep. 5, 2014.
Notice of Allowance dated Dec. 17, 2014, for U.S. Appl. No. 14/267,823 by Chan, M.A., et al., filed May 1, 2014.
Notice of Allowance dated Dec. 19, 2014, for U.S. Appl. No. 14/479,140 by Chan, M.A., et al., filed Sep. 5, 2014.
Notice of Allowance dated Dec. 22, 2014, for U.S. Appl. No. 14/179,744 by Quan, J., et al., filed Feb. 13, 2014.
Final Office Action dated Dec. 23, 2014, for U.S. Appl. No. 14/158,733 by Quan, J., et al., filed Jan. 17, 2014.
Notice of Allowance Mar. 17, 2015, for U.S. Appl. No. 14/158,733, Quan, J., et al., filed Jan. 17, 2014.
Notice of Allowance dated Mar. 30, 2015, for U.S. Appl. No. 13/772,163, Quan, J., filed Feb. 20, 2013.
Notice of Allowance dated Mar. 30, 2015, for U.S. Appl. No. 14/267,823, Chan, M.A., et al., filed May 1, 2014.
Non-Final Office Action dated Apr. 8, 2015, for U.S. Appl. No. 13/865,515, Quan, J., et al., filed Apr. 18, 2013.
Non-Final Office Action dated Apr. 8, 2015, for U.S. Appl. No. 14/228,190, Quan, J., et al., filed Mar. 27, 2014.
Notice of Allowance dated Apr. 15, 2015, for U.S. Appl. No. 14/479,140, Chan, M.A., et al., filed Sep. 5, 2014.
Final Office Action dated Jul. 24, 2014, U.S. Appl. No. 14/179,709 by Quan, J., et al., filed Feb. 13, 2014.
Final Office Action dated Nov. 6, 2014, U.S. Appl. No. 14/158,682 by Quan, J., et al., filed Jan. 17, 2004.
International Search Report dated Sep. 11, 2014, 7 pps., for International Application No. filed Mar. 21, 2014 PCT/2013/031488.
Layton, J.B., "User Space File Systems," Linux Magazine, accessed at http://www.linux-mag.com/id/7814, Jun. 22, 2010, pp. 1-4.
Non Final Office Action dated Nov. 3, 2014, for U.S. Appl. No. 13/772,163 by Quan, J., filed Feb. 20, 2013.
Non Final Office Action dated Oct. 23, 2014, for U.S. Appl. No. 14/252,674 by Chan, M.A., et al., filed Apr. 14, 2014.
Non-Final Office Action dated Aug. 26, 2014, for U.S. Appl. No. 14/267,823 by Chan, M.A., et al., filed May 1, 2014.
Notice of Allowance dated Aug. 12, 2014, U.S. Appl. No. 14/179,709 by Quan, J., et al., filed Feb. 13, 2014.
Notice of Allowance dated Sep. 3, 2014, U.S. Appl. No. 14/160,444 by Quan, J., et al., filed Jan. 21, 2014.
Restriction Requirement dated Aug. 29, 2014 for U.S. Appl. No. 14/252,674 by Chan, M.A., et al., filed Apr. 14, 2014.
U.S. Appl. No. 14/479,087 by Chan, M.A et al., filed Sep. 5, 2014.
U.S. Appl. No. 14/479,140 by Chan, M.A et al., filed Sep. 5, 2014.
Non-Final Office Action dated May 27, 2014, U.S. Appl. No. 14/158,733 by Quan, J., et al., filed Jan. 17, 2014.
Non-Final Office Action dated Jun. 9, 2014, for U.S. Appl. No. 14/167,939 by Quan, J., et al., filed Jan. 29, 2014.
Restriction Requirement dated Jun. 12, 2014, for U.S. Appl. No. 14/251,463 by Quan, J., et al., filed Apr. 11, 2014.
"Oscthulhu: Applying Video Game State-Based Synchronization to Network Computer Music"—McKinney et al, Chad McKinney Audio, Sep. 2012 http://www.chadmcki nneyaudio.com/W P-Content/resou rces/papers/OSCthu lhu I CMC20 12.pdf.
Non-Final Office Action dated May 8, 2014, U.S. Appl. No. 14/179,744 by Quan, J., et al., filed Feb. 13, 2014.
Non-Final Office Action dated May 9, 2014, U.S. Appl. No. 14/160,444 by Quan, J., et al., filed Jan. 21, 2014.
Notice of Allowance dated May 14, 2014, Co-pending U.S. Appl. No. 14/158,715, by Quan et al., filed Jan. 17, 2014.
Notice of Allowance dated May 20, 2014, Co-pending U.S. Appl. No. 14/173,680, by Quan et al., filed Feb. 5, 2014.
Co-Pending Design U.S. Appl. No. 29/436,424 by Chan, M.A., et al., filed Mar. 28, 2014.
Co-Pending U.S. Appl. No. 14/042,398 by Chan, M.A., et al., filed Sep. 30, 2013.
Co-Pending U.S. Appl. No. 14/042,567 by Chan, M.A., et al., filed Sep. 30, 2013.
Co-Pending U.S. Appl. No. 14/221,174 by Chan, M.A., et al., filed Mar. 20, 2014.
Co-Pending U.S. Appl. No. 14/228,190 by Quan, J., et al., filed Mar. 27, 2014.
Co-Pending U.S. Appl. No. 14/251,463 by Quart, J., et al., filed Apr. 11, 2014.
Co-Pending U.S. Appl. No. 14/252,674 by Chan, M.A., et al., filed Apr. 14, 2014.
Co-Pending U.S. Appl. No. 14/267,323 by Chan, M.A., et al., filed May 1, 2014.
Non-Final Office Action dated Apr. 2, 2014, U.S. Appl. No. 14/179,709 by Quan, J., et al., filed Feb. 13, 2014.
Non-Final Office Action dated Apr. 3, 2014, U.S. Appl. No. 14/158,682 by Quan, J., et al., filed Jan. 17, 2004.
Non-Final Office Action dated Mar. 10, 2014, Co-pending U.S. Appl. No. 14/173,680, by Quan et al., filed Feb. 5, 2014.
Notice of Allowance dated Apr. 15, 2014, Co-pending U.S. Appl. No. 14/167,834, by Quan et al., filed Jan. 29, 2014.
Co-Pending U.S. Appl. No. 14/179,709 by Quan, J., e tal., filed Feb. 13, 2014.
Co-Pending U.S. Appl. No. 14/179,744 by Quan, J., et al., filed Feb. 13, 2014.
Non-Final Office Action dated Mar. 7, 2014, Co-pending U.S. Appl. No. 14/158,715, by Quan et al., filed Jan. 17, 2014.

(56) References Cited

OTHER PUBLICATIONS

Co-Pending U.S. Appl. No. 13/772,163 by Quan, J., filed Feb. 20, 2013.
Co-Pending U.S. Appl. No. 14/158,682 by Quan, J., et al., filed Jan. 17, 2004.
Co-Pending U.S. Appl. No. 14/158,715 by Quan, J., et al., filed Jan. 17, 2014.
Co-Pending U.S. Appl. No. 14/173,680 by Quan, J., et al., filed Feb. 5, 2014.
Co-Pending U.S. Appl. No. 14/167,834 by Quan, J., et al., filed Jan. 29, 2014.
Co-Pending U.S. Appl. No. 13/865,515 by Quan, J., et al., filed Apr. 18, 2013.
Co-Pending U.S. Appl. No. 14/158,733 by Quan, J., et al., filed Jan. 17, 2014.
Co-Pending U.S. Appl. No. 14/160,444 by Quan, J., et al., filed Jan. 21, 2014.
Co-Pending U.S. Appl. No. 14/167,939 by Quan, J., et al., filed Jan. 29, 2014.
Co-Pending U.S. Appl. No. 14/042,509 by Chan, M.A., et al., filed Sep. 30, 2013.
International Search Report and Written Opinion dated Feb. 3, 2014, 7 pp., for International Application No. PCT/US13/62729 filed Sep. 30, 2013.
International Search Report and Written Opinion dated Feb. 3, 2014, 9 pp., for International Application No. PCT/US13/62986 filed Oct. 2, 2013.
International Search Report and Written Opinion dated Feb. 3, 2014, 7 pp., for International Application No. PCT/2013/62737 filed Sep. 30, 2013.

* cited by examiner

APPLICATION STATE BACKUP AND RESTORATION ACROSS MULTIPLE DEVICES

CROSS-REFERENCE TO RELATED APPLICATIONS

This application claims to the benefit of U.S. Provisional Patent Application No. 61/708,794, entitled "CLOUD COMPUTING INTEGRATED OPERATING SYSTEM", which was filed on Oct. 2, 2012, which is incorporated by reference herein in its entirety.

This application is a continuation of U.S. patent application Ser. No. 14/043,034, entitled "APPLICATION STATE BACKUP AND RESTORATION ACROSS MULTIPLE DEVICES", which was filed on Oct. 1, 2013, which is a continuation-in-part of U.S. patent application Ser. No. 13/772,163, entitled "APPLICATION STATE SYNCHRONIZATION ACROSS MULTIPLE DEVICES", which was filed on Feb. 20, 2013, now U.S. Pat. No. 9,106,721, which are incorporated by reference herein in their entirety.

FIELD OF THE INVENTION

At least one embodiment of the present invention pertains to cloud computing, and more particularly, to automatic backup and restoration of application states across multiple devices using cloud storage.

BACKGROUND

Application state data are data used to record the running status of a computer application. One example of application state data is a game save for a game application. A game save is a piece of digitally stored information about the progress of a user operating the game application. The game save can be reloaded later, so that the user can continue where he stopped. The user instructs the game application to generate a game save (i.e. save the game) to prevent the loss of progress in the game, especially when he is interrupted or ending a game session.

Sharing and backing up game saves among users have been common for many years. Originally, by swapping memory cards with game saves, users could help each other to unlock features in a game application. With the growing popularity of the Internet, users start to upload their game saves from their devices to Internet servers. By downloading a game save from an Internet server, a user can continue the progress of the game on the device on which he played the game or another device such as a computer, game console, or smart phone. However, to achieve the goal of continuing the progress on another device, the user needs to deliberately instruct the device to save the game progress (i.e. game save) and to upload the game save to a server or a memory card. Then the user needs to download the game from the server or the memory card to the other device, and then instructs the other device to load the game save. The whole process is tedious and requires many user interventions. Furthermore, the process only works for game applications that are specifically designed with game saving functionalities.

SUMMARY

Techniques introduced here provide an automatic mechanism for backing up and restoring application state across multiple devices. In accordance with the techniques introduced here, a method includes running an instance of a computer application at a first electronic device, and determining a backup event that occurs in the first electronic device. The backup event suggests a backup of application state data and the application state data represent an application state of the computer application at the backup event. The method further includes transmitting the application state data of the computer application to a remote storage service, in response to the backup event. Another electronic device can retrieve the application state data of the computer application from the remote storage service, and restore the computer application to the application state using the application state data.

The backup proceeds automatically on the background of the operating system of the device and is transparent to the user as well as the application. The user can restore the application state of the application running on the same device or on another device at where the state of the application has been backed up. The application state backup and restore can be achieved at the operating system level of the devices. There is no special treatment or design needed for the computer application itself. Any computer application capable of running on such an operating system can take advantage of the application state backup and restore functionality.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

A method of application state synchronization across devices is described herein. For example, a user plays a game on his smart phone, and stops playing and turns off the screen of his smart phone. The state of the game application is synchronized between his smart phone and other electronic devices via a cloud system. He can pick up his tablet computer and continue to play the game from where he left off. The synchronization is not necessarily directly triggered by a user intervention. For instance, the synchronization can be automatically triggered when the screen of the smart phone is turned off, or the user closes the game on his smart phone. The synchronization proceeds automatically on the background and is transparent to the user. Furthermore, the cloud system can analyze various information, including device profile, user profile and user history, to determine state of which application is to be synchronized and to which device the state is synchronized.

Figure 1:
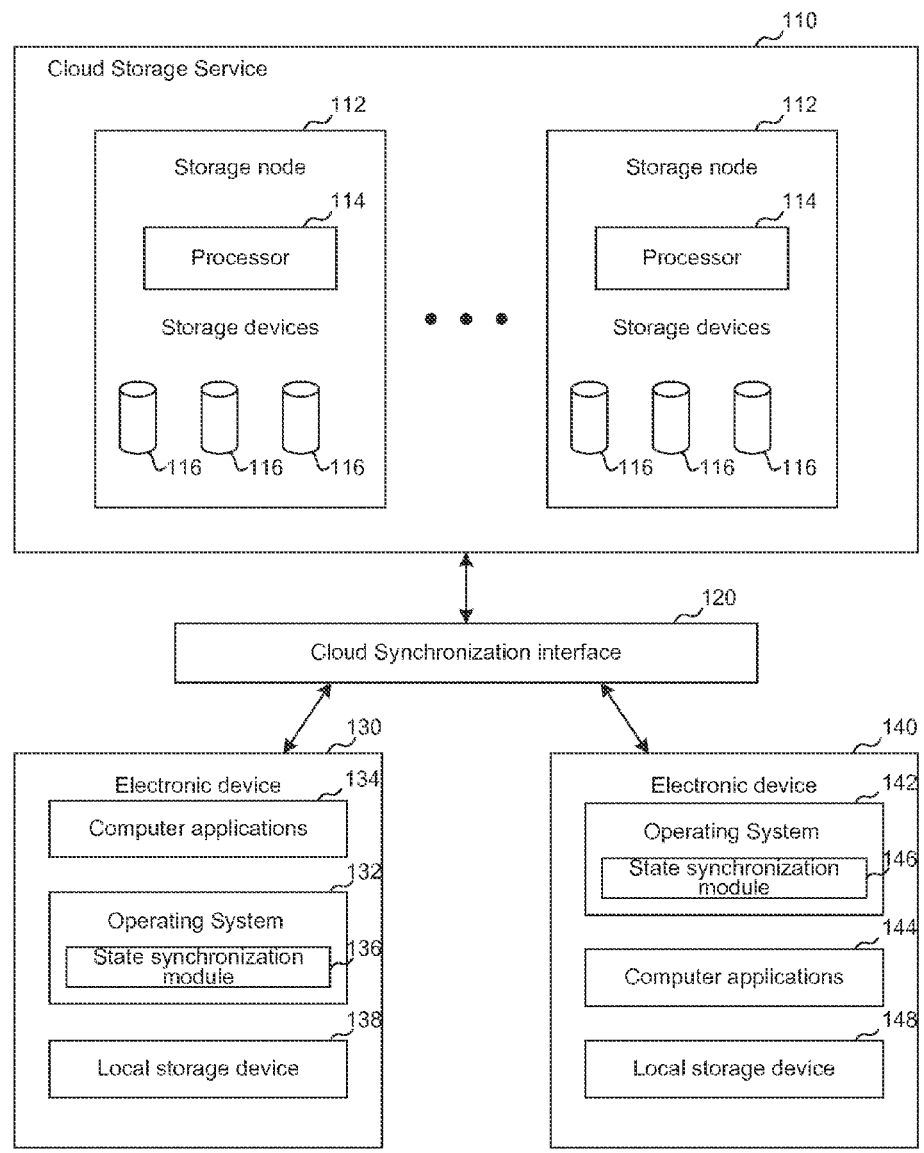
FIG. 1 illustrates an example system for application state synchronization between electronic devices.

FIG. 1 illustrates an example system for application state synchronization between electronic devices. The system includes a cloud storage service 110 configured to store state data for applications. In one embodiment, the cloud storage service 110 can be a storage cluster having computer nodes interconnected with each other by a network. The storage cluster can communicate with other electronic devices via the Internet. The cloud storage service 110 contains storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage, or any other computer storage medium which can be used to store the desired information.

A cloud synchronization interface 120 can also be included to receive data to be stored in the cloud storage service. The cloud synchronization interface 120 can include network communication hardware and network connection logic to receive the information from electronic devices. The network can be a local area network (LAN), wide area network (WAN) or the Internet. The cloud synchronization interface 120 may include a queuing mechanism to organize the received synchronization data to be stored in the cloud storage service 110. The cloud synchronization interface 120 can communicate with the cloud storage service 110 to send requests to the cloud storage service 110 for storing application state data and retrieving data.

An electronic device 130 includes an operating system 132 to manage the hardware resources of the electronic device 130 and provide services for running computer applications 134. The computer application 134 stored in the electronic device 130 require the operating system 132 to properly run on the device 130. The electronic device 130 can backup application states of the computer applications 134 to the cloud storage service 110. The electronic device 130 includes at least one local storage device 138 to store the computer applications, application data, and user data. The electronic device 130 can synchronize the application state data with the cloud storage service 110 via the cloud synchronization interface 120. The electronic device 130 or 140 can be a desktop computer, a laptop computer, a tablet computer, an automobile computer, a game console, a smart phone, a personal digital assistant, or other electronic devices capable of running computer applications, as contemplated by a person having ordinary skill in the art.

The computer applications 134 stored in the electronic device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the electronic device 130 includes a state synchronization module 136 to backup application state information from the local storage. The state synchronization module 136 can operate to keep the application state data from the electronic device 130 in synchronization with the cloud storage service 110 and other devices.

Similarly, another electronic device 140 can also synchronize the application state with the cloud storage service 110. The electronic devices 130 and 140 can synchronize the application states between each other via the cloud storage service 110. For instance, the electronic device 130 can synchronize the application state of a computer application to the cloud storage service 110. The cloud storage service 110 communicates with the electronic device 140 to know that the electronic device 140 also contain this computer application and the application state of this computer application is not updated on the electronic device 140. In turn, the cloud storage service 110 sends the application state data to the electronic device 140. Thus, the application state of this computer application is synchronized between the electronic devices 130 and 140.

In one embodiment, the synchronization for backups from the electronic devices 130 and 140 to the cloud storage service 110 may take place on a configurable periodic basis, such as an hour or a day. In other words, the synchronization is scheduled to take place on a periodic basis. The scheduled synchronization can also check for updates that can be sent from the cloud storage service 110 to the electronic devices 130 and 140.

Another type of synchronization can be a triggered when an event occurs on the electronic device 130 or 140, and then the state synchronization module can initialize the application state data synchronization with the cloud storage service 110. The triggered synchronization does not need the intervention from the user. For instance, a user turns off the screen of the electronic device 130. The screen turning off event can trigger an application state data synchronization with the cloud storage service 110 as well as other electronic devices. However, the user does not need to specifically instruct the device to synchronize; the user does not even need to realize that the synchronization occurs.

In one embodiment, the backup event can be any of the following events: the screen of the electronic device being turned off, the instance of the computer application being closed, the instance of the computer application being paused, the instance of the computer application having been run continuously for a preconfigured period of time, the instance of the computer application being switched by another application, the instance of the computer application being switched from the foreground to a background of the operating system, a battery level of the electronic device being below a preconfigured value, the electronic device turning off, the electronic device switching to standby mode, a clock of the electronic device reaching a preconfigured time of day, and the electronic device being in a preconfigured location In one embodiment, the synchronization can be a delta synchronization where the electronic device 130 or 140 detects a change (i.e. delta) of application state data and only the changed data or difference are synchronized to the cloud storage device 110.

Any electronic device running an operating system having the state synchronization module can initialize the application state synchronization. In addition, the cloud storage service 110 can also initialize the application state synchronization. In one embodiment, the cloud storage service 110 may analyze the electronic devices to determine which device is to be synchronized and state data of which application are to be synchronized.

Figure 2:
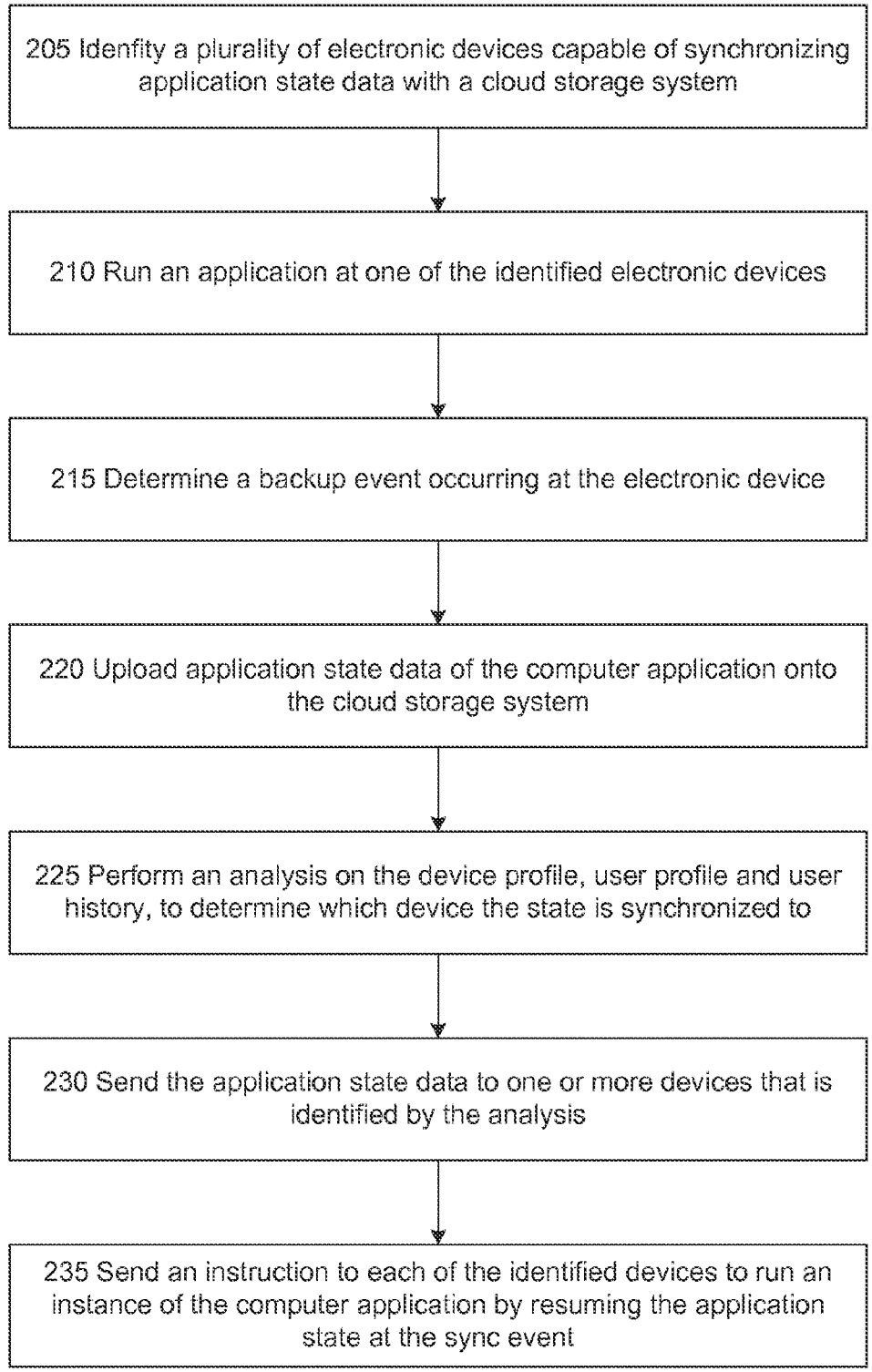
FIG. 2 illustrates an example of an application states synchronization process across multiple electronic devices.

FIG. 2 illustrates an example of an application states synchronization process across multiple electronic devices. At step 205, a cloud storage system identifies a plurality of electronic devices capable of synchronizing application state data with the cloud storage system. The electronic devices may be capable of communicating with the cloud storage system via a network, such as the Internet, a WiFi Network, or a cellular phone network. At step 210, one of the identified electronic devices runs an application.

At step 215, a backup event is determined to occur at the electronic device. The operating system of the electronic device automatically determines the backup event, without the intervention from the user. The user does not specifically instruct the backup event. The user does not even need to realize the backup event. There is no need for a sync button, a sync gesture, a sync menu item, or a sync command. In other words, the operating system of the device makes the determination of a backup event. For instance, the operating system may recognize an event of the screen being turned off as a backup event. The operating system may also recognize an event of a running application being closed or being switched by another application as a backup event. The operating system may further recognize an event of a system standby as a backup event. The operating system of the device can determine other types of backup events, as contemplated by a person having ordinary skill in the art.

Once the operating detects a backup event, the operating system of the electronic device uploads the application state data of the computer application onto the cloud storage system at step 220. The operating system of the device may decide to immediately start uploading the application state data after the backup event, or start the upload a certain amount of time after the backup event. For instance, if the electronic device detects that there is another electronic device of the same user in a very close proximity, the operating system of the device may decide to start the upload immediately because of a high possibility that the user will start using the other device soon. In another embodiment, the electronic device may decide to start the upload at a certain time of day or at certain location. For instance, the electronic device may decide to start the upload at midnight 12 AM and at the user's home (determined by GPS location or WiFi location), so that the upload of the application state data does not intervene with normal operation of the device.

In one embodiment, the developer of the computer application does not need to specifically write any implementation for uploading the application state data. For example, there are no API calls embedded in the computer application for the application state data. The state synchronization module of the operating system is responsible for monitoring, collecting, and uploading the application state data. In some embodiments, the state synchronization module compares the current application state on the device and the application state already stored in the cloud storage service. If the current application state is newer than the application state stored in the cloud storage service, the state synchronization module determines a difference (i.e. delta) between the current application state data and the application state data stored in the cloud storage service. In this way, the state synchronization module only needs to upload the difference to the cloud storage service. The cloud storage service is responsible for incorporating the difference into the application state data already stored.

At step 225, the cloud storage system performs an analysis on the device profile, user profile and user history, to determine which device the state is synchronized to. For instance, in one embodiment, the cloud storage system determines the devices that the same user is using (e.g. the devices which have established the user's user account). In another embodiment, the analysis is based on usage pattern. For example, the cloud storage service can determine to synchronize the application state to devices that the user has been frequently used during a specific time period, e.g. a week. Alternatively, the cloud storage service can determine to synchronize the application state to devices on which the user has been running that computer application. In yet another embodiment, the analysis is based on a proximity algorithm. For example, the cloud storage service can determine to synchronize the application state to devices that are physically close to the device in step 210. The proximity may be determined by GPS locations, WiFi network locations, cellular networking locations or the combination thereof. In still another embodiment, the analysis is based on the types of applications installed on the devices. For example, the cloud storage service can determine to synchronize the application state to devices that have instances of that application installed, or devices that have similar applications installed. Furthermore, the analysis can be determined by a combination of the above techniques, as well as any other device or user information as contemplated by a person having ordinary skill in the art.

The same types of analysis disclosed in the previous paragraph are used in determining the priority of synchronization. For instance, if there are application state data for multiple applications in the cloud storage service to be synchronized. The cloud storage service may determine to synchronize the state data for one application because the user has been frequently using that application during a recent time period, e.g. a week. In one embodiment, the cloud storage service decides a priority list including a reference to the application state data for the computer application, wherein the priority list regulates the order of transmitting the application state data for the computer application and data for other applications based on the analyzing of the user profile and the hardware profiles of electronic devices.

In some embodiments, the analysis is performed after the cloud storage system receives application state data from a device. In some other embodiments, the analysis can be performed before the cloud storage system receives any application state data or before the backup event occurs.

At step 230, the cloud storage system sends the application state data to one or more devices that are identified by the analysis. The identified devices receive the application state data. Therefore, the instances of the application running on the devices are synchronized with the most up-to-date state. A user can run an instance of the application on any of these devices and the instance of the application resumes from the most up-to-date state. In one embodiment, the cloud storage system further sends an instruction to each of the identified devices to run an instance of the computer application by resuming the application state at the backup event at step 235.

In one embodiment, the application state data of a computer application may include application memory data, application local storage data, hardware configuration data, and user account configuration data. The state synchronization module of the operating system is capable of collecting these data and uploading the data as included in the application state data to the cloud storage service. Based on the application state data, an operating system of another electronic device can recreate the same environment and status of the application on the other electronic device.

In some embodiments, the electronic devices are capable of synchronizing application state data between each other via a network, such as a WiFi network, Bluetooth network, or a cellular phone network. Each of the electronic devices contains a network component configured to directly synchronize the application state data with another electronic device.

Figure 3:
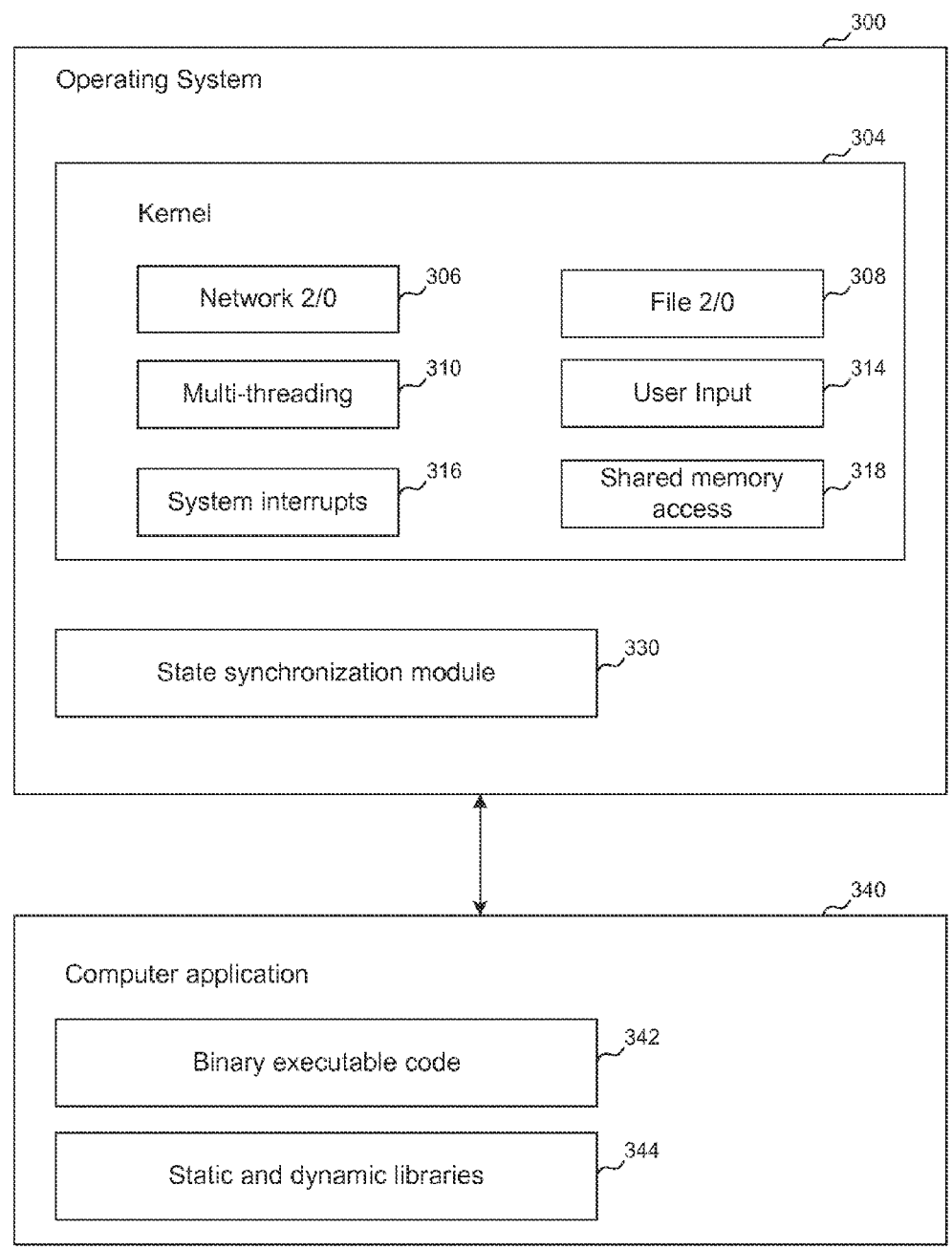
FIG. 3 illustrates an example operating system of an electronic device.

FIG. 3 illustrates an example operating system of an electronic device, according to one embodiment. The operating system 300 includes a kernel 304. The kernel 304 provides interfaces to hardware of the electronic device for the computer applications running on top of the kernel 304, and supervises and controls the computer applications. The kernel 304 isolates the computer applications from the hardware. The kernel 304 may include one or more intervening sources that can affect execution of a computer application. In one embodiment, the kernel 304 includes a network I/O module 306, a file I/O module 308, multi-threading module 310, user input 314, system interrupts 316, and shared memory access 318.

A state synchronization module 330 runs on top of the kernel 304. The state synchronization module 330 monitors the information from the intervening sources of the kernel 304 and records state data according the information. In the example of FIG. 3, a computer application 340 includes a binary executable code 342 that can run on top of the operating system 300. The computer application 340 can further include static and dynamic libraries 344 that are referenced by the binary executable code 342 during application running. In one embodiment, the state synchronization module 330 runs in a user space file system (e.g. FUSE) on top of a Linux kernel. In another embodiment, the state synchronization module 330 runs in a kernel file system.

Figure 4:
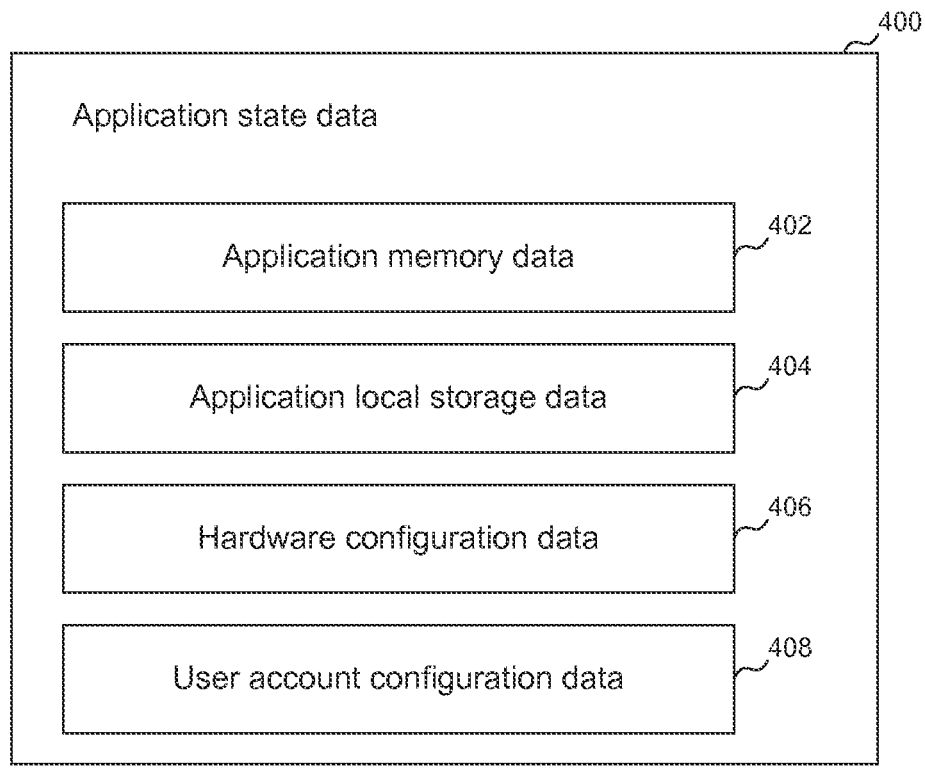
FIG. 4 illustrates an example of an application state data of a computer application collected by an operating system.

FIG. 4 illustrates an example of an application state data of a computer application collected by an operating system according to one embodiment. The application state data 400 of a computer application may include application memory data 402, application local storage data 404, hardware configuration data 406, and user account configuration data 408. In some other embodiments, the application state data can be all of or any combination of some of the fields 402, 404, 406 and 408. When the computer application is running, the state information in memory section (i.e. the application memory data 402) allocated for the application is being updated by the running application. The state synchronization module of the operating system monitors the application memory data 402, and uploads the data to a cloud storage service in response to the backup event. Furthermore, the computer application can update certain data on a local storage of the electronic device. The state synchronization module of the operating system can include the application local storage data 404 into the application state data 400. In some embodiments, the electronic device includes a memory device, e.g. flash memory, as both the memory and the local storage. Therefore, the application memory data 402 and application local storage data 404 can be one section of data that exists on the memory device of the electronic device.

The application state data 400 may further include hardware configuration data 406. For instance, the state synchronization module may record the current device sound volume level and the screen brightness level when the application is running. These device sound volume level and the screen brightness level are recorded as part of the hardware configuration data 405 and will be uploaded to the cloud storage service. Therefore, after another device is synchronized with the application state data and starts to resume running the application, the other device automatically adjusts the sound volume level and screen brightness level as on the previous device. Moreover, the application state data 400 may include user account configuration data 408. The user account configuration data 408 may include the user's preferences and choices regarding the computer application and the operating system environment for running the computer application. For instance, the user account configuration data 408 may include information about the user's language preference. Assuming the computer application is a game supporting both English and Chinese languages for user interface in the game, the user has selected the English language as the preferred language. The state synchronization module records the user's language preference as a part of the user account configuration data 408. The user account configuration data 408 is synchronized to another device via the cloud storage service. When the other device starts to resume running the application, the application will use the English language for the game interface, as indicated by the user account configuration data 408.

Figure 5:
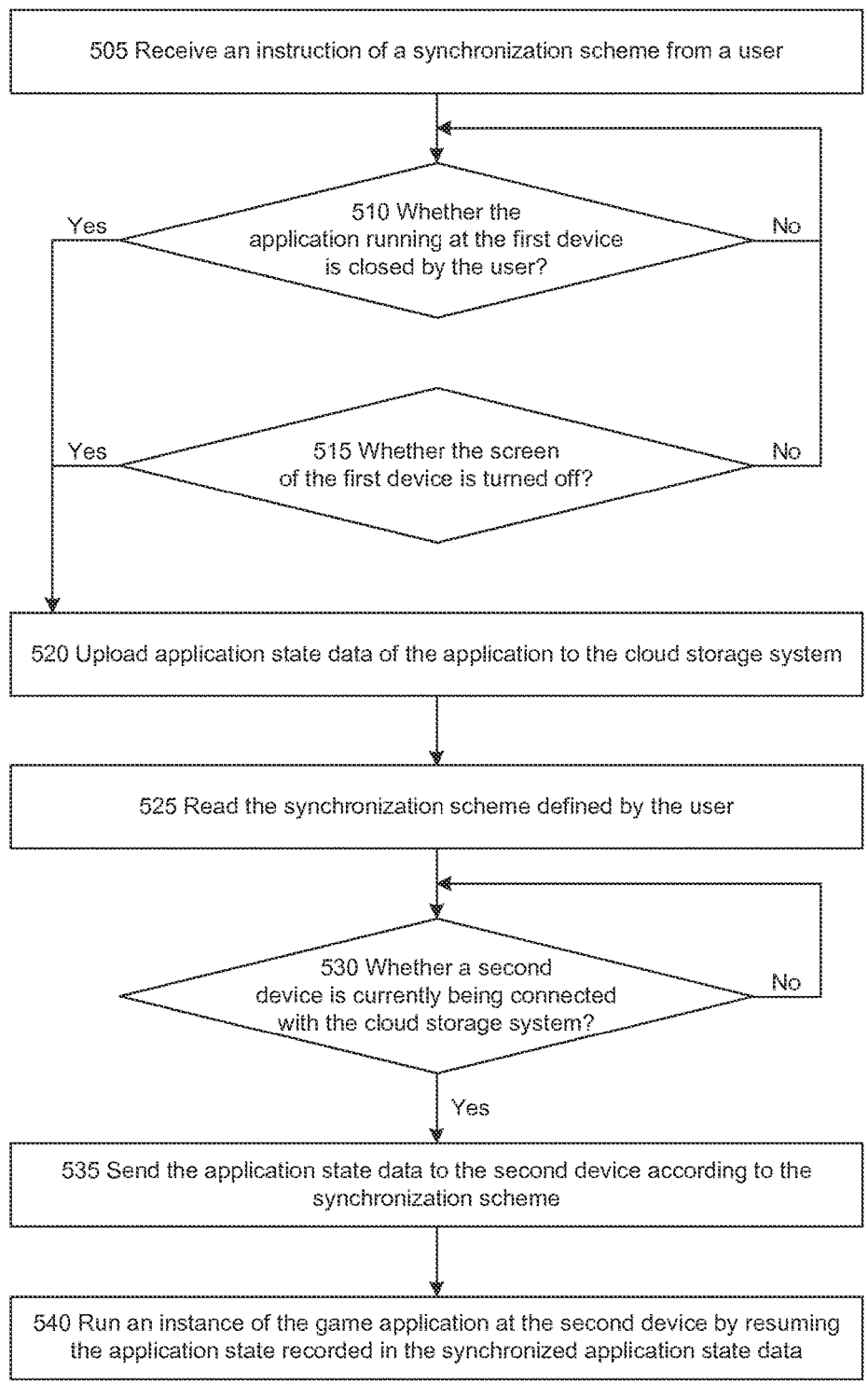
FIG. 5 illustrates an example of an application state synchronization process based on a user defined synchronization scheme.

In some embodiments, a user can define a synchronization scheme to control the way how and when the synchronization process performs. FIG. 5 illustrates an example of an application state synchronization process based on a user defined synchronization scheme. At step 505, a cloud storage service receives an instruction of a synchronization scheme from a user. The synchronization scheme includes rules of how and when the synchronization process performs. For example, in one embodiment, the synchronization scheme can define a synchronization rule between two electronic devices, a smart phone and a tablet computer, for application state of a game application. The synchronization rule specifies that one of the electronic devices start attempting to synchronize application state to the other device, as soon as the game application is closed or the screen of the device being turned off.

Assuming the smart phone is the current device running the game application, at step 510, the operating system of the smart phone checks whether the game application is closed by the user. If the game application is closed, the process continues to step 520. Otherwise, at step 515 the operating system of the smart phone continues to check whether the screen of the smart phone is turned off. If the screen is turned off, the process continues to step 520. Otherwise, the process goes back to check the status as in steps 510 and 520 in a predetermined time period.

At step 520, the smart phone uploads application state data of the game application to the cloud storage system. The schedule of the uploading can depend on a type and a speed of a connection between the smart phone and the cloud storage system. For instance, the schedule can be determined so that the uploading is delayed to use a WiFi connection, to avoid the uploading using a cellular data connection (e.g. 3G or LTE). At step 525, the cloud storage system reads the synchronization scheme defined by the user. At step 530, the cloud storage system checks whether the other device, i.e. the tablet computer, is currently being connected with the cloud storage system. If the tablet computer is connected with the cloud storage system, the system sends the application state data to the tablet computer according to the synchronization scheme at 535. Otherwise, the cloud storage system continues to check the connection with the tablet computer on a periodic basis.

At step 540, when the user starts to use the tablet computer, the tablet computer starts to run an instance of the game application by resuming the application state recorded in the synchronized application state data.

Figure 6:
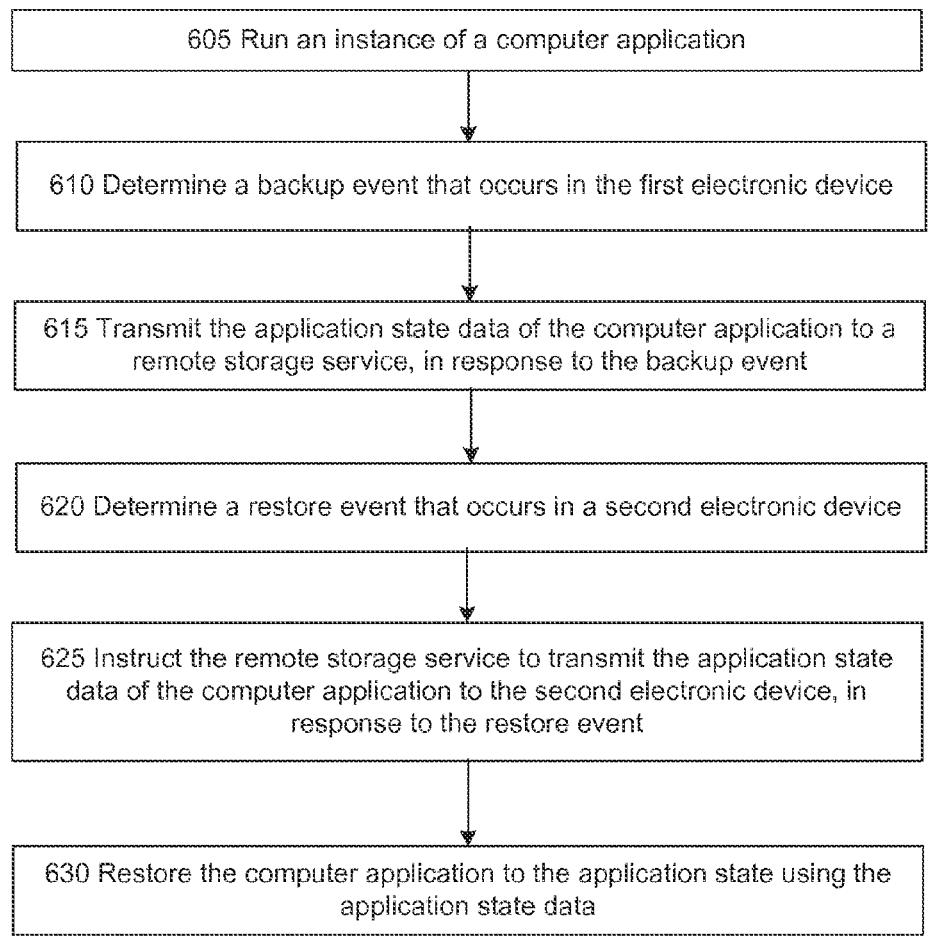
FIG. 6 illustrates an example of an application state backup and restoration process.

In some embodiments, an electronic device can automatically back up the application state data to a cloud storage service and restore the application state be retrieving the application state data from the cloud storage service. FIG. 6 illustrates an example of an application backup and restore process. At step 605, an first electronic device runs an instance of a computer application. At step 610, the first electronic device determines a backup event that occurs in the first electronic device. The backup event suggests a backup of application state data and the application state data represent an application state of the computer application at the backup event. The backup event can be automatic and does not need to be instructed by a user who is operating the instance of the computer application.

At step 615, the first electronic device transmits the application state data of the computer application to a remote storage service, in response to the backup event. The remote storage service can be a cloud computing service. Alternatively, the remote storage service can belong to a cloud storage service cluster. The first electronic device is capable of transmitting the application state data to the remote storage service via a network, which can include the Internet, a WiFi network, or a cellular phone network. In one embodiment, the first electronic device can immediately transmit the application state data of the computer application to a remote storage service in real time without substantial delay, in response to the backup event.

The application state data of the computer application can be transmitted to the remote storage service at a preconfigured time of day or when the first electronic device is at a preconfigured location, in response to the backup event. Alternatively, the application state data of the computer application can be transmitted to the remote storage service at a schedule depending on a type and a speed of a connection between the first electronic device and the remote storage service, in response to the backup event. The schedule can be determined so that the transmitting is delayed to use a WiFi connection, to avoid the transmitting using a cellular data connection. The backup can be incremental. For instance, a difference between the application state data of the computer application and previously transmitted application state data can be transmitted to a remote storage service, in response to the backup event.

In some embodiments, the first electronic device may further determine a restore event that occurs in the electronic device, wherein the restore event suggests a restore of the application state of the computer application at the second electronic device; and instructs the remote storage service to transmit the application state data of the computer application to the second electronic, in response to the restore event.

Alternatively, a second electronic device can perform the process of restoring the application state. At step 620, the second electronic device determines a restore event that occurs in a second electronic device. The restore event suggests a restore of the application state of the computer application at the second electronic device. At step 625, the second electronic device can further instruct the remote storage service to transmit the application state data of the computer application to the second electronic device, in response to the restore event. At step 630, the second electronic device restores the computer application to the application state using the application state data.

Figure 7:
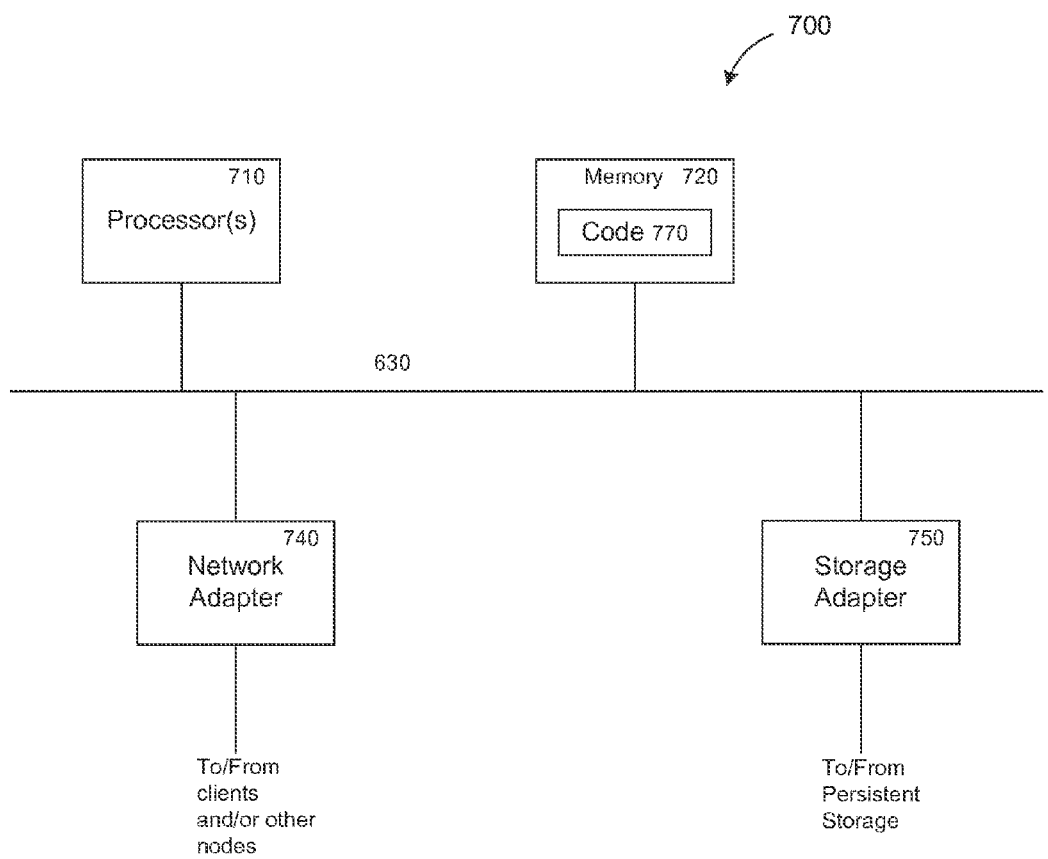
FIG. 7 is a high-level block diagram showing an example of the architecture of a computer server, which may represent any computer running the database management system described herein.

FIG. 7 is a high-level block diagram showing an example of the architecture of a computer, which may represent any electronic device or any server within a cloud storage service as described herein. The server 700 includes one or more processors 710 and memory 720 coupled to an interconnect 730. The interconnect 730 shown in FIG. 7 is an abstraction that represents any one or more separate physical buses, point to point connections, or both connected by appropriate bridges, adapters, or controllers. The interconnect 730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 710 is/are the central processing unit (CPU) of the server 700 and, thus, control the overall operation of the server 700. In certain embodiments, the processor(s) 710 accomplish this by executing software or firmware stored in memory 720. The processor(s) 710 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 720 is or includes the main memory of the server 700. The memory 720 represents any form of random access memory (RAM), read-only memory (ROM), flash memory, or the like, or a combination of such devices. In use, the memory 720 may contain a code 770 containing instructions according to the techniques disclosed herein.

Also connected to the processor(s) 710 through the interconnect 730 are a network adapter 740 and a storage adapter 750. The network adapter 740 provides the server 700 with the ability to communicate with remote devices, over a network and may be, for example, an Ethernet adapter or Fibre Channel adapter. The network adapter 740 may also provide the server 700 with the ability to communicate with other computers. The storage adapter 750 allows the server 700 to access a persistent storage, and may be, for example, a Fibre Channel adapter or SCSI adapter.

The code 770 stored in memory 720 may be implemented as software and/or firmware to program the processor(s) 710 to carry out actions described above. In certain embodiments, such software or firmware may be initially provided to the server 700 by downloading it from a remote system through the server 700 (e.g., via network adapter 740).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above-mentioned examples, various other modifications and alterations of the invention may be made without departing from the invention. Accordingly, the above disclosure is not to be considered as limiting and the appended claims are to be interpreted as encompassing the true spirit and the entire scope of the invention.

The invention claimed is:

1. A computer-implemented method comprising:
running an instance of a computer application at a first electronic device;
determining a backup event that occurs in the first electronic device, wherein the backup event suggests a backup of application state data and the application state data represents an application state of the computer application at the backup event, wherein the backup event is an event from events including the instance of the computer application being closed, the instance of the computer application being paused, the instance of the computer application has been continuously running for a preconfigured period of time, the instance of the computer application being switched by another application, a battery level of the first electronic device being below a preconfigured value, the first electronic device turning off, the first electronic device switching to standby mode, a clock of the first electronic device reaching a preconfigured time of day, and the first electronic device being at a preconfigured location;
transmitting the application state data of the computer application to a remote storage service in response to the backup event;
determining a restore event that occurs in a second electronic device, wherein the restore event suggests a restoration of the application state of the computer application at the second electronic device; and
instructing the remote storage service to transmit the application state data of the computer application to the second electronic device in response to the restore event, wherein the second electronic device restores the computer application to the application state using the application state data.

2. The computer-implemented method of claim 1, wherein the first electronic device transmits the application state data at a background of an operating system of the first electronic device without user intervention.

3. The computer-implemented method of claim 1, further comprising:
determining a second restore event that occurs in the first electronic device, wherein the second restore event suggests a restoration of the application state of the computer application at the first electronic device; and
retrieving the application state data of the computer application from the remote storage service in response to the second restore event, wherein the first electronic device restores the computer application to the application state using the application state data.

4. The computer-implemented method of claim 1, further comprising:
receiving a confirmation that the computer application has been restored to the application state using the application state data.

5. The computer-implemented method of claim 1, wherein the backup event is not instructed by a user who is operating the instance of the computer application.

6. The computer-implemented method of claim 1, wherein the application state data of the computer application is immediately transmitted to the remote storage service in response to the backup event.

7. The computer-implemented method of claim 1, wherein, in response to the backup event, the application state data of the computer application is transmitted to the remote storage service at a preconfigured time of day or when the first electronic device is at a preconfigured location.

8. The computer-implemented method of claim 1, wherein, in response to the backup event, the application state data of the computer application is transmitted to the remote storage service at a schedule depending on a type and a speed of a connection between the first electronic device and the remote storage service.

9. The computer-implemented method of claim 8, wherein the schedule is determined so that the transmitting is delayed to use a WiFi connection, to avoid the transmitting using a cellular data connection.

10. The computer-implemented method of claim 1, wherein the transmitting the application state data comprises:
transmitting, in response to the backup event, a difference between the application state data of the computer application and a previously transmitted application state data to the remote storage service.

11. An electronic device comprising:
a processor; and
a memory storing instructions which, when executed by the processor, cause the electronic device to perform operations comprising:
running an instance of a computer application at the electronic device;
determining a backup event that occurs in the electronic device, wherein the backup event suggests a backup of application state data and the application state data represents an application state of the computer application at the backup event, wherein the backup event is an event from events including the instance of the computer application being closed, the instance of the computer application being paused, the instance of the computer application has been continuously running for a preconfigured period of time, the instance of the computer application being switched by another application, a battery level of the electronic device being below a preconfigured value, the electronic device turning off, the electronic device switching to standby mode, a clock of the electronic device reaching a preconfigured time of day, and the electronic device being at a preconfigured location; and
transmitting the application state data of the computer application to a storage server in response to the backup event, wherein a restore event occurs in a second electronic device, wherein the restore event suggests a restoration of the application state of the computer application at the second electronic device, wherein the application state data of the computer application is transmitted from the storage server to the second electronic device in response to the restore event, wherein the application state data is used by the second electronic device to restore the computer application to the application state on the second electronic device.

12. The electronic device of claim 11, wherein the operations further comprise:
   determining a second restore event that occurs in the electronic device, wherein the second restore event suggests a restoration of the application state of the computer application at the electronic device; and
   retrieving the application state data of the computer application from the storage server in response to the second restore event.

13. The electronic device of claim 12, wherein the operations further comprise:
   restoring the computer application to the application state at the electronic device using the application state data.

14. The electronic device of claim 11, wherein the application state data includes application memory data, application local storage data, hardware configuration data, or user account configuration data.

15. The electronic device of claim 11, wherein the computer application is a game application and the application state data includes game save data for the game application.

16. A computer-implemented method comprising:
   receiving application state data from a first electronic device, wherein the application state data represents an application state at a backup event of an instance of a computer application running at the first electronic device, wherein the backup event occurs in the first electronic device and suggests a backup of the application state data, wherein the backup event is an event from events including the instance of the computer application being closed, the instance of the computer application being paused, the instance of the computer application has been continuously running for a preconfigured period of time, the instance of the computer application being switched by another application, a battery level of the first electronic device being below a preconfigured value, the first electronic device turning off, the first electronic device switching to standby mode, a clock of the first electronic device reaching a preconfigured time of day, and the first electronic device being at a preconfigured location;
   determining a user identity for a user who runs the computer application at the first electronic device;
   receiving a notice of a restore event including the user identity, the restore event occurs in a second electronic device, wherein the restore event suggests a restoration of the application state of the computer application at the second electronic device;
   identifying the application state data associated with the user identity; and
   transmitting the application state data to the second electronic device in response to the restore event, wherein the application state data is utilized by the computer application to resume the application state at the second electronic device.

17. The computer-implemented method of claim 16, wherein the application state data is received from the first electronic device in such a manner that the first electronic device processes the application state data at a background of an operating system of the first electronic device without user intervention.

18. The computer-implemented method of claim 16, further comprising:
   determining a priority list including a reference to the application state data, wherein the priority list regulates an order of transmitting the application state data for the computer application and data for other applications based on an analysis of a user profile and a hardware profile of at least the first electronic device.

* * * * *